United States Patent [19]
Perez

[11] 4,098,176
[45] Jul. 4, 1978

[54] COFFEE BREWING DEVICE

[76] Inventor: Thomas Perez, 3310 NW. 9 Ct., Miami, Fla. 33127

[21] Appl. No.: 758,074

[22] Filed: Jan. 10, 1977

[51] Int. Cl.² .............................................. A47J 31/10
[52] U.S. Cl. ...................................................... 99/303
[58] Field of Search ........... 99/302 R, 302 FB, 302 P, 99/302 C, 300, 306, 293, 298, 303

[56] References Cited
U.S. PATENT DOCUMENTS

| | | | |
|---|---|---|---|
| 2,685,248 | 8/1954 | Ohlsson | 99/303 |
| 3,077,156 | 2/1963 | Egi | 99/303 |
| 3,670,641 | 6/1972 | Mancioli | 99/303 |
| 3,757,670 | 9/1973 | Laama | 99/302 |

Primary Examiner—Robert W. Jenkins

[57] ABSTRACT

A coffee brewing device which includes an upper container and a lower container in screw-threaded engagement and captivating a coffee holder between the two. In the upper container an annular distribution ring with a plurality of holes is arranged on the floor so that sugar can be distributed about it. The ring is connected in fluid communication with the coffee holder by an upwardly extending central stem and a downwardly extending tube connected to the distribution ring. When heat is applied to the lower container, water is heated and passes through a bed of coffee in the coffee holder to be brewed and the brew enters the upper container after passage upwardly through the stem and, thence, downwardly through the tube to the distribution ring and out the holes where it dissolves the sugar on the upper container floor to brew a sweetened cup of coffee.

4 Claims, 3 Drawing Figures

COFFEE BREWING DEVICE

FIELD OF THE INVENTION

This invention relates to coffee brewers.

BACKGROUND OF THE INVENTION

In the past there have been numerous types of coffee brewing apparatus; however, the introduction of sugar into the coffee once brewed and while it is still at an elevated temperature level is desired. It is for this purpose that this invention provides a means in the form of an annular brewed coffee distribution ring with perforated holes which is arranged on the floor of the upper container and through which brewed coffee is constrained to pass to mix and blend with the sugar while at an elevated temperature to provide a particularly brewed and highly tasteful cup of coffee.

In accordance with these objects, and, the general object of providing an improved coffee brewing apparatus which is economical to manufacture and which is adapted to make a particularly brewed and tasteful cup of coffee as is described more fully hereinafter, the instant invention will now be described with reference to the accompanying drawings, in which:

DESCRIPTION OF PREFERRED EMBODIMENT

Figure 1:
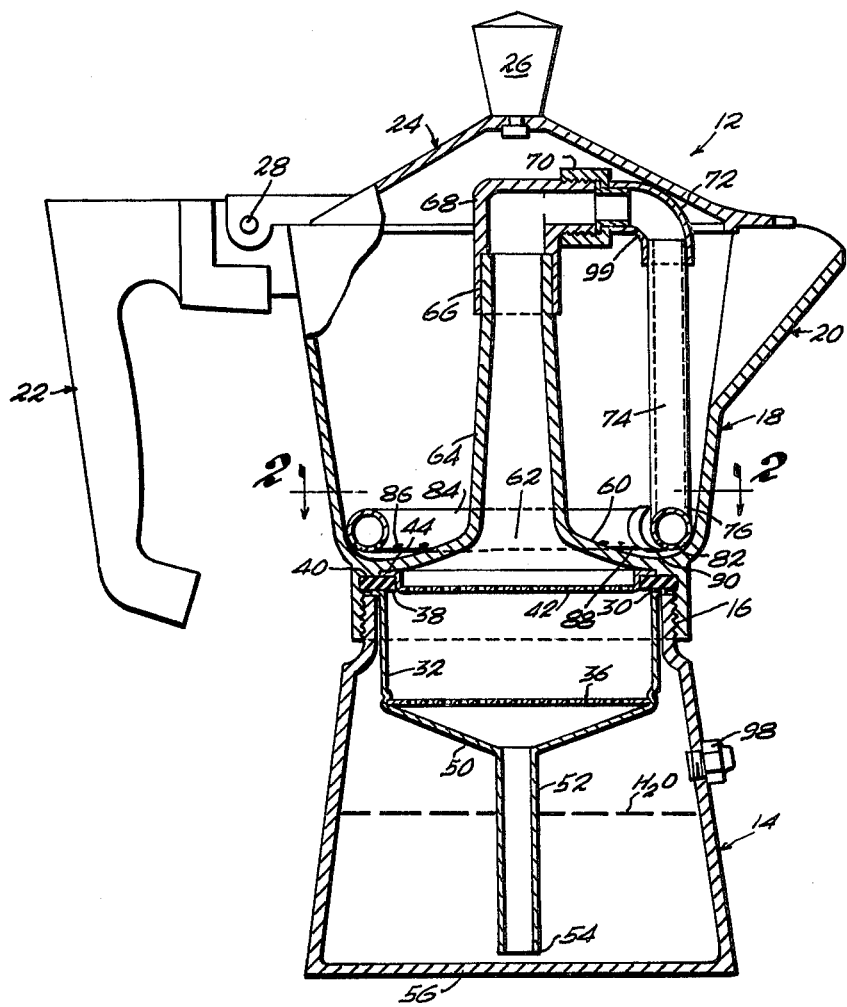
FIG. 1 is a view, partly in cross section of the coffee brewing apparatus.
Figure 2:
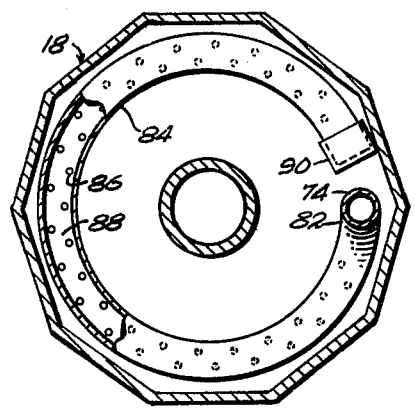
FIG. 2 is a view taken on the plane indicated by the line 2—2 of FIG. 1 and looking in the direction of the arrows.

Referring to the drawings wherein like reference characters designate like or corresponding parts throughout the several views, there is shown, in FIG. 1, a coffee brewer generally designated by the numeral 12 which comprises a lower container 14 in screw-threaded engagement as at 16 with an upper container 18 having a pouring spout 20 and a handle 22. Additionally, it may include a lid 24 with a knob 26 which is hingedly connected as at 28 to the upper container. Between the upper and lower containers there is suspended by an annular flange 30 a) a coffee holder 32 comprising an annular skirt spanned by a perforated floor 36 and b) an upper annular seal 38 which rests on the flange 30 and which mates with the lower shoulder of the upper container; the shoulder being annular and being designated by the numeral 40. The coffee holder has a perforated lid or plate 42 with an outturned flange 44 which captivates the seal 38 which is of rubbery material and is in the shape of a washer. The coffee holder includes a downwardly extending portion 50 which merges to a stem 52 which terminates at a lower end 54 adjacent the bottom 56 of the lower container. The bottom of the upper container is provided with a centrally raised floor portion, so that the outer zones such as 60 of the floor of the upper container bow outwardly downwardly forming a dome-shaped portion which through the mouth zone 62 leads to an upwardly extending stem 64 at the top of which there is connected, as at 66, an elbow piece 68 which is connected by the radially outwardly extending coupling 70 to a downturned elbow 72 and there is a downwardly extending generally vertical tube 74 which leads to a lower end 76 adjacent the floor where through an elbow, as at 82, it is connected to an annular cylindrical distribution ring 84 which has a pattern of holes such as 86 in the lower surface 88 thereof and which is capped at the end as at 90.

In use, coffee is positioned in the holder and the top container is in screw-threaded engagement with the lower container after the lower container has been filled with water. It is then heated whereupon the water rises through the stem 52 entering the mouth 54 through the coffee holder and charge of coffee and upwardly through the mouth 62 and down through the downwardly extending stem 74 to exit through the perforations of the annular ring at the floor of the upper container. In the upper container there may be a charge of sugar on the floor through which the heated coffee will be constrained to pass as it enters the upper chamber. There is a safety valve 98 provided in the lower container and, additionally, at the elbow 72 there is provided a vacuum break 99 in the form of a hole. Thereafter, when the coffee cools somewhat it will not be drawn back through to the bottom container but will remain in the upper container, since the pressures will be equalized by the presence of the hole 99.

Figure 3:
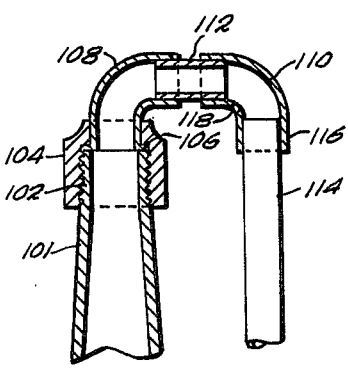
FIG. 3 is a view of the upper central zone of the invention shown in FIG. 1 and showing a slightly modified embodiment thereof.

With respect to FIG. 3, the upwardly extending stem 101 terminates at a threaded end 102 to which there is connected a threaded collar 104 which is captivated by a shoulder 106 on an elbow 108 which terminates at an open end which is connected to a downwardly turned elbow 110 through a connector pipe of short length 112 and wherein the downwardly extending portion 114 is press-fitted to the downturned portion 116 of the elbow 110. In this manner, the same may be separated conveniently. Also, it will be noted that the vacuum relief hole 118 is provided.

What is claimed is:

1. A coffee brewing apparatus comprising, an upper container and a lower container, an openwork coffee holding member suspended between the upper and lower containers and screw-threaded means for joining the containers together, said lower container including a floor and said coffee holder including a stem extending downwardly toward said floor in open communication with the coffee holder and said stem terminating at a mouth adjacent the floor of said lower container, said upper container including a floor defining a wide central annular mouth in fluid communication with the coffee holder, said floor extending upwardly defining a stem in the upper container, said stem terminating at an upper mouth, said upper portion having a coffee pouring spout and said upper mouth terminating at about the level of the coffee pouring spout, a radially upwardly extending cylindrical fluid passageway defining structure and a downwardly extending passageway defining structure extending to a zone adjacent the floor of the upper container and an annular ring connected to the downwardly extending structure and arranged adjacent the floor of the upper member, said structures and ring being in fluid communication with the stem in the upper container and upper mouth, whereby coffee is adapted to be brewed and flowed through the stem's coffee holder structure and ring and out the hole so that when sugar is placed on the floor of the upper container, the brewed coffee will be constrained to pass through a charge of sugar.

2. The device as set forth in claim 1 wherein said top is hingedly connected to the upper container.

3. The device as set forth in claim 2 wherein a relief valve is provided in the lower container.

4. The device as set forth in claim 1 wherein a vacuum release hole is provided in the cylindrical member zone in the upper container.

* * * * *